(12) United States Patent
Hara et al.

(10) Patent No.: US 8,009,005 B2
(45) Date of Patent: Aug. 30, 2011

(54) REACTOR APPARATUS FOR A RAILWAY VEHICLE

(75) Inventors: Kazuhiko Hara, Tokyo (JP); Yoichi Hisamori, Tokyo (JP); Yoshitaka Kotani, Tokyo (JP)

(73) Assignee: Mitsubishi Electric Corporation, Chiyoda-Ku, Tokyo (JP)

( * ) Notice: Subject to any disclaimer, the term of this patent is extended or adjusted under 35 U.S.C. 154(b) by 122 days.

(21) Appl. No.: 12/596,113

(22) PCT Filed: Jun. 13, 2007

(86) PCT No.: PCT/JP2007/061916
§ 371 (c)(1),
(2), (4) Date: Oct. 15, 2009

(87) PCT Pub. No.: WO2008/152710
PCT Pub. Date: Dec. 18, 2008

(65) Prior Publication Data
US 2010/0301986 A1   Dec. 2, 2010

(51) Int. Cl.
*H01F 27/06* (2006.01)
(52) U.S. Cl. .................................. 336/65; 336/68
(58) Field of Classification Search .............. 336/65–68, 336/90, 98
See application file for complete search history.

(56) References Cited

U.S. PATENT DOCUMENTS

| | | | | |
|---|---|---|---|---|
| 3,264,590 A | * | 8/1966 | Trench | 336/60 |
| 3,703,692 A | * | 11/1972 | Peschel | 336/134 |
| 3,883,836 A | * | 5/1975 | Ward et al. | 336/134 |
| 4,485,368 A | * | 11/1984 | Messe | 336/84 M |
| 6,477,965 B2 | * | 11/2002 | Yamaguchi et al. | 105/59 |
| 2002/0043521 A1 | | 4/2002 | Klein et al. | |
| 2010/0013586 A1 | * | 1/2010 | Ceretta | 336/90 |

FOREIGN PATENT DOCUMENTS

| | | |
|---|---|---|
| DE | 10117846 | 2/2003 |
| JP | 39-018352 Y1 | 6/1964 |
| JP | 57-161233 | 4/1981 |
| JP | 04-142717 | 5/1992 |
| JP | 06-176932 | 6/1994 |
| JP | 7-279415 A | 10/1995 |
| JP | 09-102427 A | 4/1997 |
| JP | 2003-163122 A | 6/2003 |
| JP | 2003-517934 | 6/2003 |

OTHER PUBLICATIONS

International Search Report (PCT/ISA/210) for PCT/JP2007/061916 mailed Sep. 18, 2007.
Written Opinion (PCT/ISA/237) for PCT/JP2007/061916 mailed Sep. 18, 2007.
Supplementary European Search Report in a corresponding EPO application dated Mar. 16, 2011, 4 pgs.
Decision of a Patent Grant in a corresponding JP application dated Mar. 29, 2011 and an English-language translation, 5 pages.

* cited by examiner

*Primary Examiner* — Anh T Mai
(74) *Attorney, Agent, or Firm* — Buchanan Ingersoll & Rooney PC

(57) ABSTRACT

A reactor apparatus for a railway vehicle includes a coil assembly, a side cover, through bolts inserted into the coil assembly, cover supporting members, a pair of frames, and ribs that reinforce the pair of frames. A support/fixation section of each frame is fixed to an under surface of a vehicle pedestal. The pair of the frames are disposed on both sides of the coil assembly, and support the through bolts and the cover supporting member. For each rib, leg members that extend from corresponding reinforcing body are penetrated into and welded to the corresponding frame. For each cover supporting member, a leg member that extends from corresponding cover supporting body is penetrated into and welded to the corresponding frame.

8 Claims, 5 Drawing Sheets

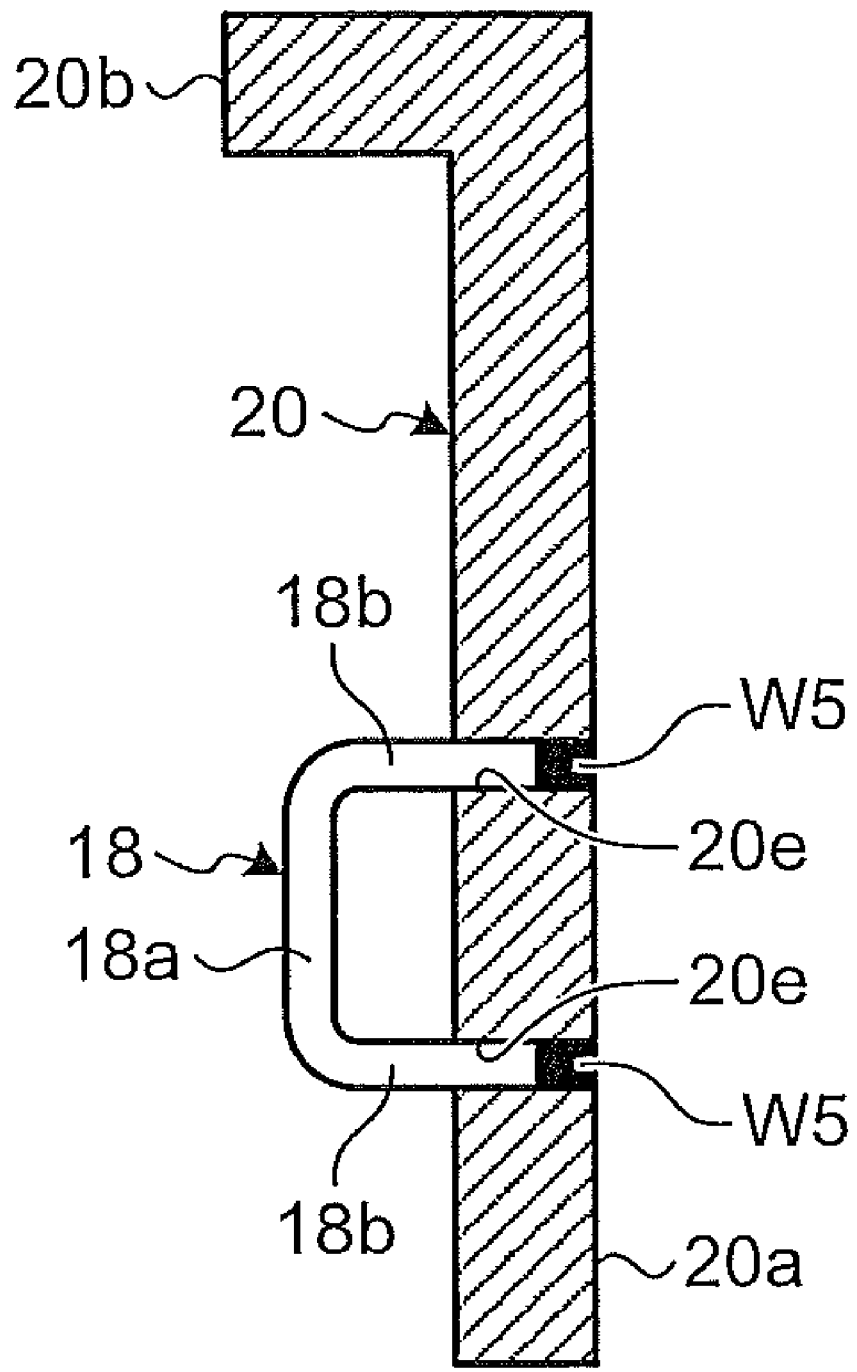

REACTOR APPARATUS FOR A RAILWAY VEHICLE

TECHNICAL FIELD

The present invention relates to a reactor apparatus for a railway vehicle that includes a direct-current air-core reactor disposed under the floor of a railway vehicle as a vehicle electric component and a frame structure supporting the reactor.

BACKGROUND ART

A conventional frame structure is known that includes a face plate, edge-end vertical reinforcing ribs, an intermediate vertical reinforcing rib, and a plurality of horizontal reinforcing ribs. The edge-end vertical reinforcing ribs are formed continuously at the left edge-end and the right edge-end of the face plate in the vertical direction. The intermediate vertical reinforcing rib is formed continuously at the intermediate portion of the face plate in the vertical direction. The horizontal reinforcing ribs are formed between the edge-end vertical reinforcing ribs and the intermediate vertical reinforcing rib and are spaced apart by a predetermined distance in the vertical direction of the face plate. In such a frame structure, the edge-end vertical reinforcing ribs are formed by bending the left edge-end and the right edge-end of the face plate into an L-shape, while the intermediate vertical reinforcing rib and the horizontal reinforcing ribs are formed by bending a steel plate into an L-shape. Moreover, the intermediate vertical reinforcing rib and the horizontal reinforcing ribs are welded to the face plate, the edge-end vertical reinforcing ribs, and the intermediate vertical reinforcing rib (for example, see Patent Literature 1).

Patent Literature 1: Japanese Patent Application Laid-open No. H07-279415

DISCLOSURE OF INVENTION

Problem to be Solved by the Invention

However, in the abovementioned frame structure, at the time of welding and fixing the intermediate vertical reinforcing rib and intermediate horizontal reinforcing ribs as shown in FIG. 1 of Patent Literature 1, weld spatter is produced and adhered to the frame surface or an insulating vertical reinforcing ribs. In that case, it becomes necessary to remove the weld spatter by, for example, buffing after welding is completed. That causes an increase in the time required for assembly operation, thereby arising a problem.

Moreover, in a configuration in which the insulating vertical reinforcing ribs are clamped with adjacent steel wall-type frame panels by connecting bolts as shown in FIG. 6 of Patent Literature 1, weld spatter produced during welding of intermediate vertical reinforcing ribs or intermediate horizontal reinforcing ribs stuck in bolt holes in which the connecting bolts are to be inserted. In that case, it takes much time to find and remove the weld spatter that has stuck in the bolt holes. Thus, an improvement in the configuration is anticipated.

Meanwhile, the adhesion of weld spatter can be prevented by covering a portion to be welded or a portion not to be welded by a shielding material. However, there has been a problem in which covering the portion to be welded by a shielding material causes a decline in the efficiency of welding operation. Moreover, there has been a problem in which certainly covering the portion not to be welded by a shielding material is difficult if the portion has unevenness of complex nature.

The present invention has been made to solve the above problems and it is an object of the present invention to provide a direct-current air-core reactor for a vehicle and that can reduce scattering and adhesion of weld spatter to a component attachment surface and enhance an assembling operation and a design of an apparatus appearance, during attaching a weld of reinforcing ribs and the like.

Means for Solving Problem

In order to solve the above mentioned problem and achieve the object, a reactor apparatus for a railway vehicle includes a coil unit that operates as a reactor; a cover that covers periphery of the coil unit; a coil supporting member that is inserted into the coil unit; a cover supporting member that is attached to the cover; a pair of frames that are disposed both sides of the coil unit by fixing a support/fixation section bent into an L-shaped cross-sectional portion to an under surface of a vehicle pedestal, supports the coil supporting member, and supports the cover supporting member; and a reinforcing member that is provided on the support/fixation section of each of the frames and reinforces the L-shaped cross-sectional portion, wherein the reinforcing member includes a reinforcing body that abuts against the L-shaped cross-sectional portion and a leg member that extends from the reinforcing body to penetrate the frame, the leg member is welded to the frame at a side opposite to the inserted side, and the cover supporting member includes a cover supporting body that is fixed to the cover and a leg member that extends from the cover supporting body to penetrate the frame, the leg member is welded to the frame at a side opposite to the inserted side.

Effect of the Invention

According to the present invention, a leg member of a reinforcing member and a leg member of a cover supporting member are inserted in a frame and welded to the frame at a side opposite to the inserted side. That enables achieving reduction in scattering and adhesion of weld spatter to the frame surface and avoiding a situation in which weld spatter adheres to the portion where a coil supporting member or a cover supporting member is fixed to the frame thereby making the fixing difficult. As a result, it becomes possible to enhance the configuration design and the assembly workability.

BRIEF DESCRIPTION OF DRAWINGS

FIG. 9 is a cross-sectional view for illustrating welding of an electric-wire holding member to a frame in a reactor apparatus for a railway vehicle according to a third embodiment of the present invention.

Figure 1:
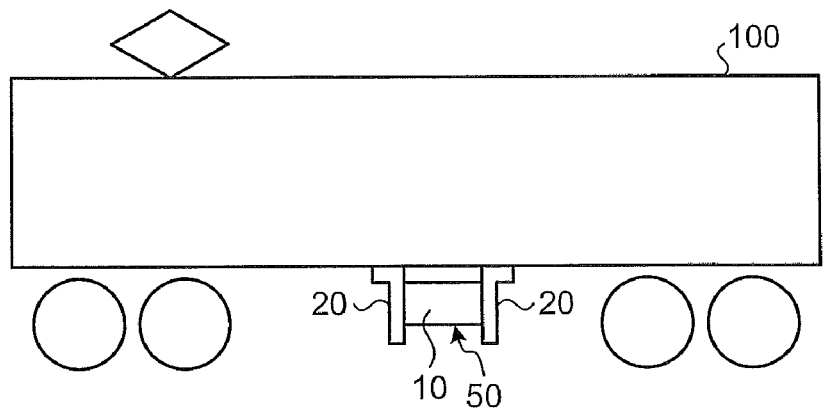
FIG. 1 is a schematic diagram for illustrating an arrangement of a reactor apparatus for a railway vehicle according to the present invention mounted on a railway vehicle.

EXPLANATIONS OF LETTERS OR NUMERALS 10 coil assembly (coil unit)
11 side cover (cover)
12 through bolt (coil supporting member)
14 cover supporting member
14a cover supporting body
14b leg member
15 rib (reinforcing member)
15a rib body (reinforcing body)
15b leg member
16 clamping bolt
18 electric-wire holding member
18a electric-wire holding body
18b leg member
20 frame
20a main body of frame
20b support/fixation section of frame
20c, 20d, 20e through hole
41 vehicle pedestal
50, 60 reactor apparatus for a railway vehicle
100 railway vehicle

BEST MODE(S) FOR CARRYING OUT THE INVENTION

Exemplary embodiments for a reactor apparatus for a railway vehicle according to the present invention will be described below in detail with reference to the accompanying drawings. The present invention is not limited to the embodiment described below.

First Embodiment

FIG. 1 is a schematic diagram for illustrating an arrangement of a reactor apparatus for a railway vehicle according to the present invention mounted on a railway vehicle. A reactor apparatus for a railway vehicle 50 is disposed under a floor frame of a railway vehicle 100. The reactor apparatus for a railway vehicle 50 includes a coil assembly (coil unit) 10 that operates as an air-core reactor, and a pair of frames 20, 20 that support the coil assembly 10 at a vehicle pedestal.

Figure 2:
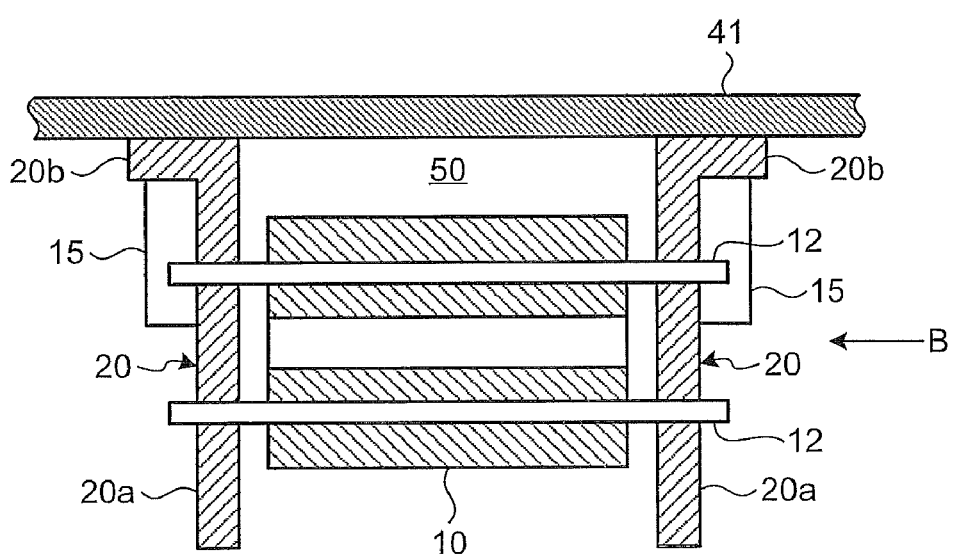
FIG. 2 is a cross-sectional view, taken along A-A line in FIG. 3, of the reactor apparatus for a railway vehicle according to a first embodiment of the present invention.
Figure 3:
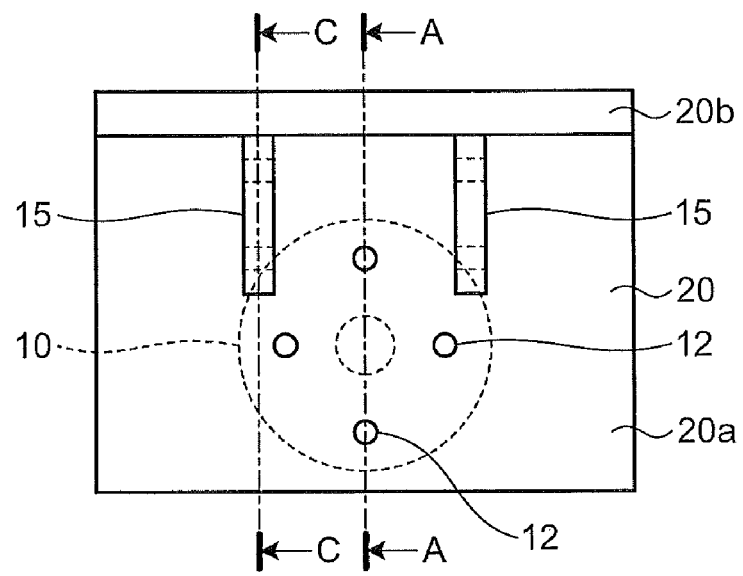
FIG. 3 is a side view, taken from the direction of an arrow B in FIG. 2, of the reactor apparatus for a railway vehicle according to the first embodiment.
Figure 4:
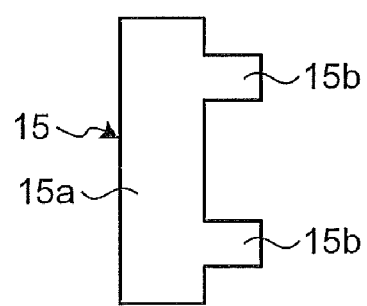
FIG. 4 is an enlarged view of a rib (reinforcing member).
Figure 5:
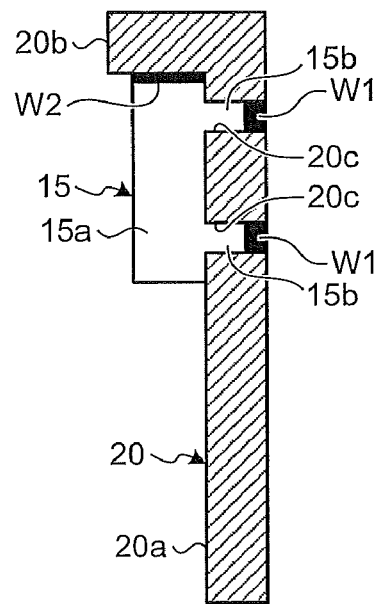
FIG. 5 is partial cross-sectional view, taken along C-C line in FIG. 3, for illustrating welding of a rib to a frame.

FIG. 2 is a cross-sectional view, taken along A-A line in FIG. 3, of the reactor apparatus for a railway vehicle according to a first embodiment of the present invention. FIG. 3 is a side view, taken from the direction of an arrow B in FIG. 2, of the reactor apparatus for a railway vehicle according to the first embodiment. FIG. 4 is an enlarged view of a rib (reinforcing member). FIG. 5 is partial cross-sectional view, taken along C-C line in FIG. 3, for illustrating welding of a rib to a frame.

In FIG. 2, the coil assembly 10 that operates as a reactor has a substantially cylindrical shape. A reactor is a device that causes reactance in an alternating-current circuit. A plurality of through bolts (coil supporting members) 12 are penetratingly inserted into the coil assembly 10 along the cylindrical axis line thereof.

The pair of frames 20, 20 are fixed to an under surface of a vehicle pedestal 41 and disposed on both sides of the coil assembly 10. Each of the frames 20, 20 includes a tabular main body 20a and a support/fixation section 20b. The support/fixation section 20b having an L-shaped cross-section formed by bending is fixed to the under surface of the vehicle pedestal 41, while the main body 20a extends downward from the vehicle pedestal 41. The through bolts 12 are disposed across the pair of frames 20, 20 through the coil assembly 10. By supporting the through bolts 12, the pair of frames 20, 20 holds the coil assembly 10 from the vehicle pedestal 41.

The reactor apparatus for a railway vehicle 50 additionally includes a rib (reinforcing member) 15 that is attached to the inner corner portion between the support/fixation section 20b and the main body 20a of each of the frame 20. Each rib 15 reinforces the L-shaped cross-sectional portion of the corresponding frame 20. Each rib 15 includes a rib body (reinforcing body) 15a and leg members 15b. The reinforcing body 15a remains abutted against the L-shaped cross-sectional portion at a first-surface side of the corresponding frame 20 (i.e., the side opposite to the coil assembly 10), while the leg members 15b extend from the rib body 15a and penetrate the corresponding frame 20 (see FIG. 4). More particularly, the leg members 15b are welded to the frames at inside the through holes 20c on a second-surface side (the side of the coil assembly 10) that is opposite to the first-surface side of the corresponding frame 20 (see welded portions W1 shown in FIG. 5). In order to realize the constitution, the through holes 20c are formed on each frame 20 for inserting the leg members 15b of the corresponding rib 15. Moreover, the rib 15 is welded to the corresponding frame 20 at the abutting portion to the support/fixation section 20b as indicated by a welded portion W2 in FIG. 5.

Each frame 20 is manufactured by bending a plate material of a predetermined thickness to have an L-shaped cross section. For this reason, the corner portion between the support/fixation section 20b and the main body 20a of each frame 20 over which the corresponding rib 15 abuts is shown to be rectangular in FIG. 3. However, in practice, the cross section has an arc-like shape with a predetermined curvature. Thus, the corners of each rib 15 are cut in a predetermined shape such that the rib 15 can remain properly abutted against the surface of the corresponding support/fixation section 20b and the main body 20a. On the other hand, the through holes 20c formed on each frame 20 and penetrating the leg members 15b are formed in a slightly larger size than the outer shape of the leg members 15b. The size of the through holes 20c enables to regulate the leg members 15b at the inner peripheral surface, thereby positioning the leg members 15b within a plane parallel to the surface having greater area of the corresponding frame 20.

The specific dimensions are explained as follows. When the thickness of each frame 20 (length of the through holes 20c in each frame 20) is 12 mm, then it is favorable to make the leg members 15b of each rib 15 about 10 mm long (about 80% of the length of the through holes 20c) such that the welded portions W1 fall inside the through holes 20c. If the outer diameter of the leg members 15b is 9 mm, then it is favorable to make the through holes 20c to have the inner diameter of about 9.4 mm, which is slightly larger than the outer diameter of the leg members 15b (about 1.05 times). That allows appropriately positioning and fixing the leg members 15b. If the leg members 15b are rectangular in shape, then it is favorable to make the vertical and horizontal dimensions of the opening of each through hole 20c larger by about 1.05 times of the size of the leg members 15b.

In this way, by fixing the rib 15 in the corner portion between the support/fixation section 20b and the main body 20a, the mechanical strength of the support/fixation section 20b can be enhanced against the stress that works to drop the corresponding frame 20. Meanwhile, although it might be considered to insert the entire rib 15 in the corresponding frame 20 and weld the rib 15 to the second-surface side of the frame 20, such a configuration is not favorable because more amount of weld spatter might adhere to the backside of the frame 20.

When it is desired to further enhance the mechanical strength of the support/fixation section 20b, the corresponding rib 15 can be welded to the first-surface side of the corresponding frame 20, in addition to the welding performed at the second-surface side of the corresponding frame 20. In that case, the adhesion of weld spatter can be reduced by implementing TIG (Tungsten Inert Gas) welding method. Alternatively, the adhesion of weld spatter can also be reduced by implementing MAG (Metal Active Gas) welding method instead of the TIG welding method.

Thus, as described above, the reactor apparatus for a railway vehicle 50 according to the present embodiment includes the coil assembly 10 that operates as a reactor, the through bolts 12 that are inserted into the coil assembly 10, the pair of frames 20, 20, and the ribs 15. The pair of frames 20, 20 are disposed on both sides of the coil assembly 10 and includes the support/fixation section 20b. Each support/fixation section 20b, which is bent to have an L-shaped cross section, is fixed to the under surface of the vehicle pedestal 41. The pair of frames 20, 20 support the through bolts 12. The ribs 15 are disposed to reinforce the L-shaped cross-sectional portion of the support/fixation section 20b in the respective frames 20. Each rib 15 includes the reinforcing body 15a that remains abutted against the L-shaped cross-sectional portion at the first-surface side of the corresponding frame 20 and the leg members 15b that extend from the reinforcing body 15a and penetrate the corresponding frame 20. The leg members 15b are welded to the corresponding frame 20 at the second-surface side that is opposite to the first-surface side.

In this way, for each rib 15, the leg members 15b are inserted in the corresponding frame 20 and are welded to the frame 20 at the side opposite to the inserted side. Such a configuration enables achieving reduction in the scattering and adhesion of weld spatter to the surface of the frames 20. Moreover, the configuration also enables avoiding a situation in which weld spatter adheres to the portion where the through bolts 12 are fixed to the frames 20 thereby making the fixing difficult. As a result, it becomes possible to enhance the configuration design and the assembly workability.

Second Embodiment

Figure 6:
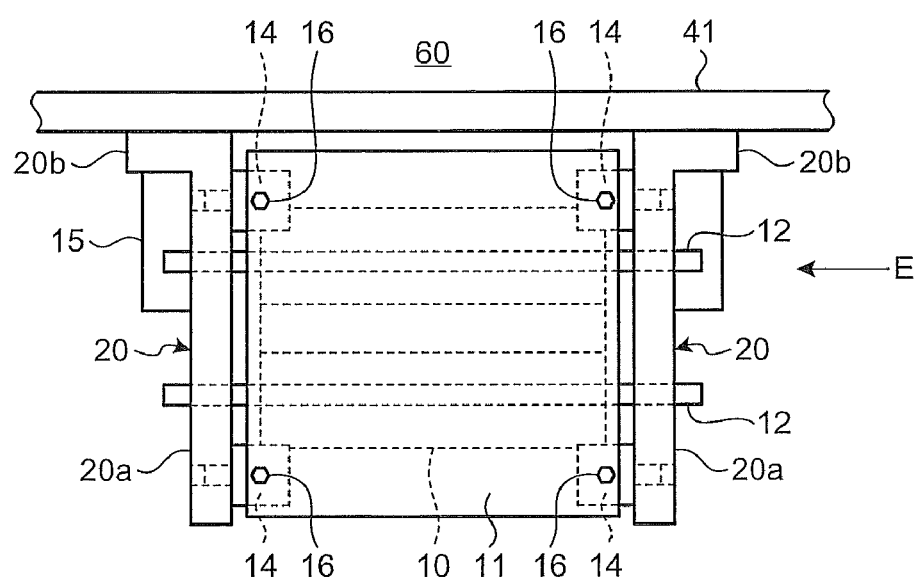
FIG. 6 is a side view, taken from the direction of an arrow D in FIG. 7, of a reactor apparatus for a railway vehicle according to a second embodiment of the present invention.
Figure 7:
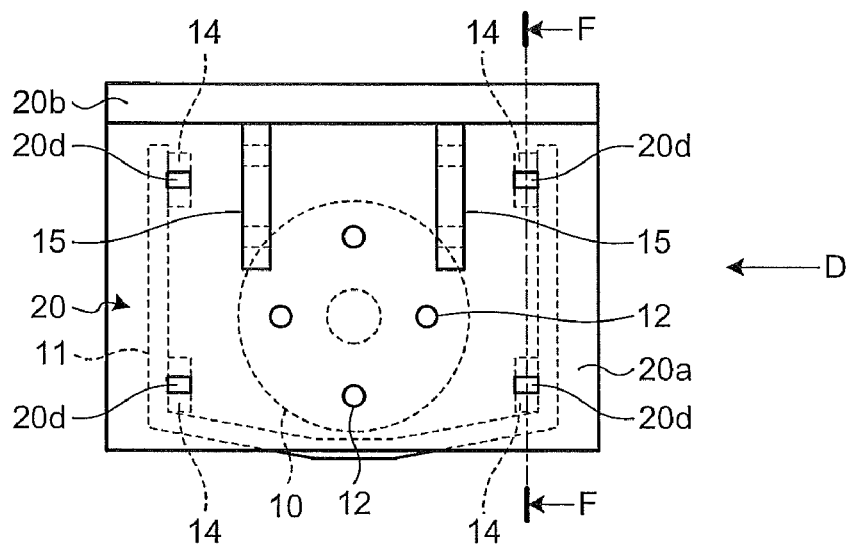
FIG. 7 is a side view, taken from the direction of an arrow E in FIG. 6, of the reactor apparatus for a railway vehicle according to the second embodiment.
Figure 8:
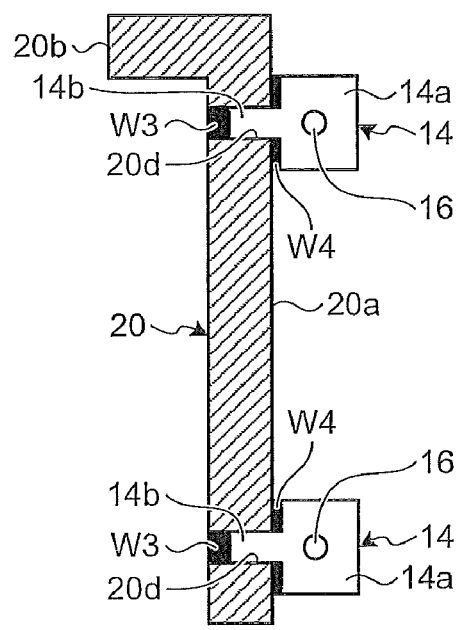
FIG. 8 is partial cross-sectional view, taken along F-F line in FIG. 7, for illustrating welding of a cover supporting member to a frame.

FIG. 6 is a side view, taken from the direction of an arrow D in FIG. 7, of a reactor apparatus for a railway vehicle according to a second embodiment of the present invention. FIG. 7 is a side view, taken from the direction of an arrow E in FIG. 6, of the reactor apparatus for a railway vehicle according to the second embodiment. FIG. 8 is partial cross-sectional view, taken along F-F line in FIG. 7, for illustrating welding of a cover supporting member to a frame. A reactor apparatus for a railway vehicle 60 according to the second embodiment includes a side cover (cover) 11 that covers the sides of the coil assembly 10. Apart from that, the configuration of the reactor apparatus for a railway vehicle 60 is identical to that described in the first embodiment.

The side cover 11 is manufactured by bending a plate material and is disposed to cover the lateral sides and the under surface of the coil assembly 10. The side cover 11 is supported by the pair of frames 20, 20 via cover supporting members 14. That is, by supporting the cover supporting members 14 that are clamped to the side cover 11 by clamping bolts 16, the pair of frames 20, 20 support the side cover 11 from the vehicle pedestal 41.

Through holes 20d are formed at the four corners of the pair of frames 20, 20 corresponding to the cover supporting members 14. Each cover supporting member 14 is fixed to the corresponding frame 20 by inserting a leg member 14b thereof in one of the through holes 20d. Each cover supporting member 14 includes a cover supporting body 14a and the leg member 14b. The cover supporting body 14a remains abutted against the cover 11 at the second-surface side (the side of the coil assembly 10). The leg member 14b extends from the corresponding cover supporting body 14a and penetrates the corresponding frame 20.

The leg member 14b of each cover supporting member 14 is welded inside one of the through holes 20d on the first-surface side of the corresponding frame 20 (see welded portions W3 in FIG. 8) by the TIG welding method. In the TIG welding method, tungsten is used as a non-consumable electrode and the welding portion is protected by a shielding gas (an inert gas such as argon or helium) while welding. Although the TIG welding method is costlier than a common welding method, it is possible to reduce the scattering and adhesion of weld spatter to the first-surface side of each frame 20. Moreover, the welding cost can be cut down by restricting welding only with respect to the leg members 14b as described in the present embodiment. Meanwhile, the abutting portion between each cover supporting member 14 and the main body 20a of the corresponding frame 20 may also be welded by a common welding method as indicated by welded portions W4 in FIG. 8.

Each through hole 20d penetrating the leg member 14b of the corresponding cover supporting member 14 regulates the leg member 14b at the inner peripheral surface, thereby positioning the leg member 14b (i.e., the corresponding cover supporting member 14) within a plane parallel to the corresponding frame 20.

The specific dimensions are explained as follows. When the thickness of each frame 20 (length of the through holes 20d) is 12 mm, then it is favorable to make the leg member 14b of each cover supporting member 14 about 10 mm long (about 80% of the length of the through holes 20d) such that the welded portions W3 fall inside the through holes 20d. If the width (thickness) of the leg members 14b is 12 mm, then it is favorable to make the through holes 20d to have the size of about 12.6 mm, which is slightly larger than the outer diameter of the leg members 14b (larger by about 1.05 times). That allows appropriate positioning and fixing of the leg members 14b. If the leg members 15b are rectangular in shape, then it is favorable to make the vertical and horizontal dimensions of the opening of each through hole 20d larger by about 1.05 times of the size of the leg members 14b.

Thus, as described above, the reactor apparatus for a railway vehicle 60 according to the present embodiment includes the coil assembly 10 that operates as a reactor and the side cover 11 that covers periphery of the coil assembly 10. In addition, as a supporting structure to these components, the reactor apparatus for a railway vehicle 60 includes the through bolts 12 that are inserted into the coil assembly 10, the cover supporting members 14 that are attached to the side cover 11, the pair of frames 20, 20, and the ribs 15. The pair of frames 20, 20 are disposed on both sides of the coil assembly 10 and each of the frame 20 includes the support/fixation section 20b. Each support/fixation section 20b, which is bent to have an L-shaped cross section, is fixed to the under surface of the vehicle pedestal 41. The pair of frames 20, 20 are disposed to support the through bolts 12 and the cover supporting members 14. The ribs 15 are disposed to reinforce the L-shaped cross sectional portion of the support/fixation section 20b in the respective frames 20.

Each rib 15 includes the reinforcing body 15a that remains abutted against the L-shaped cross sectional portion at the first-surface side of the corresponding frame 20 and the leg members 15b that extend from the reinforcing body 15a and penetrate the corresponding frame 20. The leg members 15b are welded to the corresponding frame 20 at the second-surface side opposite to the first-surface side. Each cover supporting member 14 includes the cover supporting body 14a that is fixed to the side cover 11 at the second-surface side of the corresponding frame 20 and the leg member 14b that extends from the cover supporting body 14a and penetrates the corresponding frame 20. Each leg member 14b is welded to the first-surface side of the corresponding frame 20.

According to the present embodiment, in the rib 15 and the cover supporting member 14, the leg members 15b and the leg member 14b are inserted in the corresponding frame 20 and are welded to the frame 20 at the side opposite to the inserted side. Such a configuration enables achieving reduction in the scattering and adhesion of weld spatter to the surface of the frames 20. Moreover, the configuration also enables avoiding a situation in which weld spatter adheres to the portion where the through bolts 12 or the cover supporting members 14 are fixed to the frames 20 thereby making the fixing difficult. As a result, it becomes possible to enhance the configuration design and the assembly workability.

Third Embodiment

FIG. 9 is a cross-sectional diagram for illustrating welding of an electric-wire holding member to a frame in a reactor apparatus for a railway vehicle according to a third embodiment of the present invention. The reactor apparatus for a railway vehicle according to the present embodiment includes an electric-wire holding member 18 in addition to the configuration described in the second embodiment. The electric-wire holding member 18 is attached to one of the frames 20 and holds an outwardly-extending electric wire. The electric-wire holding member 18 is manufactured by, for example, bending a rod-like material to have a rectangular-shape or a U-shape. The electric-wire holding member 18 includes an electric-wire holding body 18a that holds an electric wire at the first-surface side of the corresponding frame 20 and leg members 18b that extend from the electric-wire holding body 18a and penetrate the frame 20. More particularly, the leg members 18b are welded to the corresponding frame 20 at inside through holes 20e on the second-surface side (welded portions W5 shown in FIG. 9). The through holes 20e penetrating the leg members 18b of the electric-wire holding member 18 regulate the leg members 18b at the inner peripheral surface, thereby positioning the leg members 18b (i.e., the electric-wire holding member 18) within a plane parallel to the corresponding frame 20.

According to the present embodiment, the leg members 18b of the electric-wire holding member 18 are inserted in one of the frames 20 and are welded to the corresponding frame 20 at the side opposite to the inserted side. Such a configuration enables achieving reduction in the scattering and adhesion of weld spatter to the surface of the frames 20. Moreover, the configuration also enables avoiding a situation in which weld spatter adheres to the portion where the through bolts 12 or the cover supporting members 14 are attached to the frames 20 thereby making the fixing difficult. As a result, it becomes possible to enhance the configuration design and the assembly workability.

Meanwhile, the method of welding a leg member penetrated into the frame 20 to the frame 20 at the side opposite to the inserted side is not limited to the ribs 15, the cover supporting members 14, and the electric-wire holding member 18. That is, the method can be applied in fixing any other component that is attachable to the frames 20.

INDUSTRIAL APPLICABILITY

In this way, the reactor apparatus for a railway vehicle according to the present invention is useful to apply to a reactor apparatus in which a reactor is supported by a frame reinforced with a reinforcing member, and suitably applied to a reactor apparatus for a railway vehicle mounted on a railway vehicle.

The invention claimed is:

1. A reactor apparatus for a railway vehicle comprising:
   a coil unit that operates as a reactor;
   a cover that covers the periphery of the coil unit;
   a coil supporting member that is inserted into the coil unit;
   a cover supporting member that is attached to the cover;
   a pair of frames that are disposed on both sides of the coil unit by fixing a support/fixation section bent into an L-shaped cross-sectional portion to an under surface of a vehicle pedestal, supports the coil supporting member, and supports the cover supporting member; and
   a reinforcing member that is provided on the support/fixation section of each of the frames and reinforces the L-shaped cross-sectional portion, wherein
   the reinforcing member includes a reinforcing body that abuts against the L-shaped cross-sectional portion and a leg member that extends from the reinforcing body to penetrate the frame, the leg member being welded to the frame at a side opposite to the inserted side, and
   the cover supporting member includes a cover supporting body that is fixed to the cover and a leg member that extends from the cover supporting body to penetrate the frame, the leg member being welded to the frame at a side opposite to the inserted side.

2. The reactor apparatus for a railway vehicle according to claim 1, wherein the coil supporting member is a through bolt that is disposed across the pair of frames through the coil unit in a penetrating manner.

3. The reactor apparatus for a railway vehicle according to claim 1, wherein each of the frames has through holes that penetrate the leg members, each of the through holes having a size so that the through hole regulates the leg member at an inner peripheral surface thereof, thereby positioning the leg member within a plane parallel to the frame.

4. A reactor apparatus for a railway vehicle comprising:
   a coil unit that operates as a reactor;
   a cover that covers the periphery of the coil unit;
   a coil supporting member that is inserted into the coil unit;
   a cover supporting member that is attached to the cover;
   a pair of frames that are disposed on both sides of the coil unit by fixing a support/fixation section bent into an L-shaped cross-sectional portion to an under surface of a vehicle pedestal, supports the coil supporting member, and supports the cover supporting member; and
   a reinforcing member that is provided on the support/fixation section of each of the frames and reinforces the L-shaped cross-sectional portion, wherein the reinforcing member includes a reinforcing body that abuts against the L-shaped cross-sectional portion at a first-surface side and a leg member that extends from the reinforcing body to penetrate the frame, the leg member being welded to the frame at a second-surface side that is opposite to the first-surface side, and the cover supporting member includes a cover supporting body that is fixed to the cover at the second-surface side and a leg member that extends from the cover supporting body to penetrate the frame, the leg member being welded to the frame at the first-surface side.

5. The reactor apparatus for a railway vehicle according to claim 4, wherein the coil supporting member is a through bolt that is disposed across the pair of frames through the coil unit in a penetrating manner.

6. The reactor apparatus for a railway vehicle according to claim 4, further comprising an electric-wire holding member that is provided on one of the pair of the frames and that holds an outwardly-extending electric wire, the electric-wire holding member including an electric-wire holding body that holds the electric wire at the first-surface side and a leg member that extends from the electric-wire holding body to penetrate the frame, the leg member being welded to the frame at the second-surface side that is opposite to the first-surface side.

7. The reactor apparatus for a railway vehicle according to claim 4, wherein each of the frames has through holes that penetrate the leg members, each of the through holes having a size so that the through hole regulates the leg member at an inner peripheral surface thereof, thereby positioning the leg member within a plane parallel to the frame.

8. The reactor apparatus for a railway vehicle according to claim 4, wherein a TIG welding method is used to weld the leg member of the cover supporting member.

* * * * *